United States Patent
Yu et al.

(10) Patent No.: US 9,729,339 B2
(45) Date of Patent: Aug. 8, 2017

(54) TRANSMISSION METHOD FOR COMMON MESSAGE AND DEVICE

(71) Applicant: Huawei Technologies Co., Ltd., Shenzhen (CN)

(72) Inventors: Zheng Yu, Shenzhen (CN); Xingqing Cheng, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 224 days.

(21) Appl. No.: 14/662,839

(22) Filed: Mar. 19, 2015

(65) Prior Publication Data
US 2015/0195094 A1    Jul. 9, 2015

Related U.S. Application Data

(63) Continuation of application No. PCT/CN2012/081778, filed on Sep. 21, 2012.

(51) Int. Cl.
*H04W 4/00* (2009.01)
*H04L 12/18* (2006.01)
(Continued)

(52) U.S. Cl.
CPC .......... *H04L 12/189* (2013.01); *H04W 4/005* (2013.01); *H04W 28/0215* (2013.01); *H04W 68/00* (2013.01); *H04W 88/08* (2013.01)

(58) Field of Classification Search
CPC  H04L 12/189; H04W 28/0215; H04W 68/00; H04W 4/005; H04W 88/08
See application file for complete search history.

(56) References Cited

U.S. PATENT DOCUMENTS

| | | | |
|---|---|---|---|
| 2009/0176514 A1* | 7/2009 | Choi | H04W 68/02 455/458 |
| 2010/0128647 A1* | 5/2010 | Chun | H04W 72/1263 370/312 |

(Continued)

FOREIGN PATENT DOCUMENTS

| | | |
|---|---|---|
| CN | 102202394 A | 9/2011 |
| CN | 102378129 A | 3/2012 |

(Continued)

OTHER PUBLICATIONS

Huawei et al., "Bandwidth Reduction for Low Cost MTC UE and Text Proposal," 3GPP TSG RAN WG1#68, Dresden Germany, R1-120051, Feb. 2012, 10 pages.

(Continued)

*Primary Examiner* — Phuc Tran
(74) *Attorney, Agent, or Firm* — Brinks, Gilson & Lione

(57) ABSTRACT

The present disclosure provides a transmission method for a common message and a device, which relates to a field of communication technologies and is invented for effectively ensuring that both a low cost MTC terminal and a normal LTE terminal may reliably receive the common message. The transmission method for the common message includes: determining common message transmission time instances corresponding to a first terminal, wherein the common message transmission time instances corresponding to the first terminal are a part of time instances of cell common message transmission time instances; sending a common message at the determined common message transmission time instances corresponding to the first terminal, a bandwidth of frequency resources used for sending the common message being no larger than a data processing bandwidth that the first terminal is capable of supporting. The present (Continued)

SIB1 transmission time instances corresponding to the low cost MTC terminal, i. e. subframe time instances when the low cost MTC terminal and the normal LTE terminal are capable of receiving the SIB1 message. The base station schedules the SIB1 message within the data processing bandwidth that the low cost MTC terminal is capable of supporting at these time instances.

Other time instances of cell SIB1 transmission time instances apart from the SIB1 transmission time instances corresponding to the low cost MTC terminal, i. e. subframe time instances when the normal LTE terminal is capable of receiving the SIB1 message. The base station does not restrictively schedule the SIB1 message within the data processing bandwidth that the low cost MTC terminal is capable of supporting at these time instances.

disclosure may be used in an M2M application based on an LTE network.

20 Claims, 9 Drawing Sheets

(51) Int. Cl.
*H04W 68/00* (2009.01)
*H04W 28/02* (2009.01)
*H04W 88/08* (2009.01)

(56) References Cited

U.S. PATENT DOCUMENTS

| | | | |
|---|---|---|---|
| 2010/0260081 A1 | 10/2010 | Damnjanovic et al. | |
| 2010/0322169 A1* | 12/2010 | Narasimha | H04W 72/0493 370/329 |
| 2011/0140846 A1* | 6/2011 | Blanz | H04W 60/04 340/7.1 |
| 2012/0327895 A1* | 12/2012 | Wallen | H04W 48/12 370/330 |
| 2014/0126508 A1* | 5/2014 | Young | H04W 4/005 370/329 |
| 2015/0124681 A1* | 5/2015 | Zhou | H04M 3/567 370/312 |

FOREIGN PATENT DOCUMENTS

| | | |
|---|---|---|
| CN | 102469547 A | 5/2012 |
| EP | 2 369 883 A1 | 9/2011 |
| WO | WO 2012/058970 A1 | 5/2012 |
| WO | WO 2012/074337 A2 | 6/2012 |

OTHER PUBLICATIONS

"3$^{rd}$ Generation Partnership Project; Technical Specification Group Radio Access Network; Evolved Universal Terrestrial Radio Access (E-UTRA); Radio Resource Control (RRC); Protocol Specification (Release 11)," Global System for Mobile Communications, 3GPP TS 36.331 V11.0.0, Jun. 2012, 302 pages.

* cited by examiner 101, the base station determines common message transmission time instances corresponding to a first terminal, wherein the common message transmission time instances corresponding to the first terminal are a part of time instances of cell common message transmission time instances 102, the base station sends a common message at the determined common message transmission time instances corresponding to the first terminal, wherein a bandwidth of frequency resources used for sending the common message is no larger than a data processing bandwidth that the first terminal is capable of supporting

Fig. 1

201, the first terminal determines common message transmission time instances corresponding to the first terminal, wherein the common message transmission time instances corresponding to the first terminal are a part of time instances of cell common message transmission time instances 202, the first terminal receives a common message sent by a base station at the determined common message transmission time instances corresponding to the first terminal, wherein a bandwidth of frequency resources used for sending the common message by the base station is no larger than a data processing bandwidth that the first terminal is capable of supporting

Fig. 2

301, the base station determines SIB1 transmission time instances corresponding to a low cost MTC terminal and other SIB1 transmission time instances of cell SIB1 transmission time instances apart from the SIB1 transmission time instances corresponding to the low cost MTC terminal according to presetting 302, the base station sends the SIB1 at the determined SIB1 transmission time instances corresponding to the low cost MTC terminal and the other SIB1 transmission time instances, wherein the bandwidth of frequency resources used for sending the SIB1 at the SIB1 transmission time instances corresponding to the low cost MTC terminal is no larger than the data processing bandwidth that the low cost MTC terminal is capable of supporting 303, the low cost MTC terminal receives the SIB1 message at the SIB1 message transmission time instances corresponding the low cost MTC terminal, and the normal LTE terminal receives the SIB1 message at the cell SIB1 message transmission time instances

Fig. 3

401, the base station predefines SI transmission time instances corresponding to a low cost MTC terminal 402, the base station determines the SI transmission time instances corresponding to the low cost MTC terminal according to predefinition 403, the base station sends the SI at the determined SI transmission time instances corresponding to the low cost MTC terminal, wherein the bandwidth of frequency resources used for sending the SI is no larger than a data processing bandwidth that the low cost MTC terminal is capable of supporting 404, the low cost MTC terminal receives the SI at the SI transmission time instances corresponding the low cost MTC terminal

Fig. 5

501, the base station predefines RAR transmission time instances corresponding to a low cost MTC terminal 502, the base station determines the RAR transmission time instances corresponding to the low cost MTC terminal according to predefinition 503, the base station sends the RAR at the determined RAR transmission time instances corresponding to the low cost MTC terminal, and the bandwidth of frequency resources used for sending the RAR is no larger than a data processing bandwidth that the low cost MTC terminal is capable of supporting 504, the low cost MTC terminal receives the RAR at the RAR transmission time instances corresponding the low cost MTC terminal

Fig. 6

601, the base station receives a paging request message of a mobility management entity (MME), wherein the paging request message carries category indication information of a paging terminal 602, when the paging terminal is the low cost MTC terminal, the base station determines paging message transmission time instances corresponding to the low cost MTC terminal according to presetting 603, the base station sends the paging message to the paging terminal at the determined paging message transmission time instances corresponding to the low cost MTC terminal, wherein the bandwidth of frequency resources used for sending the common message is no larger than a data processing bandwidth that the low cost MTC terminal is capable of supporting 604, the low cost MTC terminal receives the paging message at the paging message transmission time instances corresponding the low cost MTC terminal

Fig. 7

```
1000, the base station sends a first common message
corresponding to a first terminal 1001, the base station sends a second common message
corresponding to a second terminal
```

TRANSMISSION METHOD FOR COMMON MESSAGE AND DEVICE

CROSS-REFERENCE TO RELATED APPLICATIONS

This application is a continuation of International Application No. PCT/CN2012/081778, filed on Sep. 21, 2012, which is hereby incorporated by reference in its entirety.

TECHNICAL FIELD

The present disclosure relates to a field of communication technologies, in particular to a transmission method for a common message and a device.

BACKGROUND

In a radio communication system, a common message system information, a paging message or a random access response message which is broadcast or multicast to a terminal (UE, User Equipment) by a base station. The UE needs to receive the common message sent by the base station to acquire parameter configuration of a cell, so as to perform normal communication with the base station. Therefore, it is quite important that the UE reliably receives the common message sent by the base station.

In order to lower the cost of using a long term evolution (LTE) network in a machine-to-machine (M2M) application to massively develop the M2M application based on the LTE network, a low cost machine type communication (MTC) terminal (Low cost MTC UE) based on LTE draws great attention. Compared with the existing normal LTE terminal, the receiving bandwidth that the low cost MTC terminal is capable of supporting is decreased, thus the low cost MTC terminal may only process data, control information and/or a reference signal within a smaller bandwidth, e.g. 1.4 MHz, 3 MHz or 5 MHz. Therefore, the cost of a radio frequency and a baseband of the low cost MTC terminal is lowered obviously.

In the case that the low cost MTC terminal and the normal LTE terminal are arranged in the LTE network at the same time, both the low cost MTC terminal and the normal LTE terminal need to receive the common message sent by the base station. As the data processing bandwidth that the low cost MTC terminal is capable of supporting is smaller, the low cost MTC terminal may only process the data, the control information and/or the reference signal within a smaller bandwidth. Therefore, it is a problem to be solved how to effectively ensure that both the low cost MTC terminal and the normal LTE terminal are capable of receiving the common message reliably.

SUMMARY

A primary objective of embodiments of the present disclosure is to provide a transmission method for a common message and a device, which may effectively ensure that both a low cost MTC terminal and a normal LTE terminal are capable of receiving the common message reliably.

To achieve the above objective, the embodiments of the present disclosure adopt the following technical solutions.

In one aspect, an embodiment of the present disclosure provides a transmission method for a common message, including:
determining common message transmission time instances corresponding to a first terminal, wherein the common message transmission time instances corresponding to the first terminal are a part of time instances of cell common message transmission time instances;
sending a common message at the determined common message transmission time instances corresponding to the first terminal, a bandwidth of frequency resources used for sending the common message being no larger than a data processing bandwidth that the first terminal is capable of supporting, so that both the first terminal and a second terminal are capable of receiving the common message at the common message transmission time instances corresponding to the first terminal, wherein a data processing bandwidth that the second terminal is capable of supporting is larger than the data processing bandwidth that the first terminal is capable of supporting.

In one aspect, an embodiment of the present disclosure provides a transmission method for a common message, including:
determining, by a first terminal, common message transmission time instances corresponding to the first terminal, wherein the common message transmission time instances corresponding to the first terminal are a part of time instances of cell common message transmission time instances;
receiving, by the first terminal, a common message sent by a base station at the determined common message transmission time instances corresponding to the first terminal, wherein a bandwidth of frequency resources used for sending the common message by the base station is no larger than a data processing bandwidth that the first terminal is capable of supporting.

In another aspect, an embodiment of the present disclosure provides a base station, including:
a time instance determining unit, configured to determine common message transmission time instances corresponding to a first terminal, wherein the common message transmission time instances corresponding to the first terminal are a part of time instances of cell common message transmission time instances;
a sending unit, configured to send a common message at the common message transmission time instances corresponding to the first terminal determined by the time instance determining unit, a bandwidth of frequency resources used for sending the common message being no larger than a data processing bandwidth that the first terminal is capable of supporting, so that both the first terminal and a second terminal are capable of receiving the common message at the common message transmission time instances corresponding to the first terminal, wherein a data processing bandwidth that the second terminal is capable of supporting is larger than the data processing bandwidth that the first terminal is capable of supporting.

In another aspect, an embodiment of the present disclosure provides a terminal equipment which may serve as the first terminal in the aforementioned method embodiments, including:
a time instance determining unit, configured to determine common message transmission time instances corresponding to the terminal equipment, wherein the common message transmission time instances corresponding to the terminal equipment are a part of time instances of cell common message transmission time instances; and
a receiving unit, configured to receive a common message sent by a base station at the common message transmission time instances corresponding to the terminal equipment determined by the time instance determining unit, wherein a bandwidth of frequency resources used for sending the common message by the base station is no larger than a data processing bandwidth that the terminal equipment is capable of supporting.

According to the transmission method for the common message, the base station and the terminal equipment provided by the embodiments of the present disclosure, a part of time instances of the cell common message transmission time instances are taken as the common message transmission time instances corresponding to the first terminal; when the base station sends the common message at these time instances, the used bandwidth of frequency resources is no larger than the data processing bandwidth that the first terminal is capable of supporting, therefore, reliable reception of the common message of the first terminal may be ensured effectively; and the second terminal may also receive the common message reliably at these time instances, and apparently, the second terminal may also receive the common message at the other time instances of the cell common transmission time instances apart from the common message transmission time instances corresponding to the first terminal, therefore, reliable reception of the common message of the second terminal may also be ensured effectively. When the first terminal is a low cost MTC terminal and the second terminal is a normal LTE terminal, the transmission method for the common message, the base station and the terminal equipment provided by the embodiments of the present disclosure may effectively ensure that both the low cost MTC terminal and the normal LTE terminal may reliably receive the common message.

In another aspect, an embodiment of the present disclosure also provides a transmission method for a common message, including:
sending a first common message corresponding to a first terminal; and
sending a second common message corresponding to a second terminal, wherein the first common message is a common message obtained by simplifying the content of the second common message, and a data processing bandwidth that the first terminal is capable of supporting is smaller than a data processing bandwidth that the second terminal is capable of supporting.

In another aspect, an embodiment of the present disclosure also provides a transmission method for a common message, including:
receiving, by a first terminal, a first common message sent by a base station, the first common message being a common message obtained by simplifying the content of a common message sent to a second terminal by the base station, wherein a data processing bandwidth that the first terminal is capable of supporting is smaller than a data processing bandwidth that the second terminal is capable of supporting.

In another aspect, an embodiment of the present disclosure also provides a base station, including:
a sending unit, configured to send a first common message corresponding to a first terminal and send a second common message corresponding to a second terminal, wherein the first common message is a common message obtained by simplifying the content of the second common message, and a data processing bandwidth that the first terminal is capable of supporting is smaller than a data processing bandwidth that the second terminal is capable of supporting.

In another aspect, an embodiment of the present disclosure also provides a terminal equipment which may serve as the first terminal in the previous transmission method, including:
a receiving unit, configured to receive a first common message sent by a base station, the first common message being a common message obtained by simplifying the content of a common message sent to a second terminal by the base station, wherein a data processing bandwidth that the terminal equipment is capable of supporting is smaller than a data processing bandwidth that the second terminal is capable of supporting.

According to the transmission method for the common message, the base station and the terminal equipment provided by the embodiments of the present disclosure, the base station sends the common message to the first terminal and the second terminal, the common message sent to the first terminal is simplified compared with the common message sent to the second terminal, and the demand on the data processing bandwidth that the first terminal is capable of supporting is met, therefore, reliable reception of the common message of the first terminal and the second terminal may be ensured effectively. When the first terminal is a low cost MTC terminal and the second terminal is a normal LTE terminal, the transmission method for the common message, the base station and the terminal equipment provided by the embodiments of the present disclosure may effectively ensure that both the low cost MTC terminal and the normal LTE terminal may reliably receive the common message.

BRIEF DESCRIPTION OF THE DRAWINGS

In order to illustrate the technical solutions in the embodiments of the present disclosure or in the prior art more clearly, a brief introduction on the accompanying drawings which are needed in the description of the embodiments or the prior art is given below. Apparently, the accompanying drawings in the description below are some of the embodiments of the present disclosure, based on which other drawings can be acquired by the persons of ordinary skill in the art without any inventive efforts.

FIG. 1 is a flowchart of a transmission method for a common message provided by an embodiment of the present disclosure.

FIG. 2 is a flowchart of a transmission method for a common message provided by an embodiment of the present disclosure.

FIG. 3 is a flowchart of a transmission method for a common message provided by an embodiment of the present disclosure when the common message is a SIB1 message.

FIG. 5 is a flowchart of a transmission method for a common message provided by an embodiment of the present disclosure when the common message is SI.

FIG. 6 is a flowchart of a transmission method for a common message provided by an embodiment of the present disclosure when the common message is a RAR.

FIG. 7 is a flowchart of a transmission method for a common message provided by an embodiment of the present disclosure when the common message is a Paging.

DETAILED DESCRIPTION OF THE EMBODIMENTS

Figure 4:
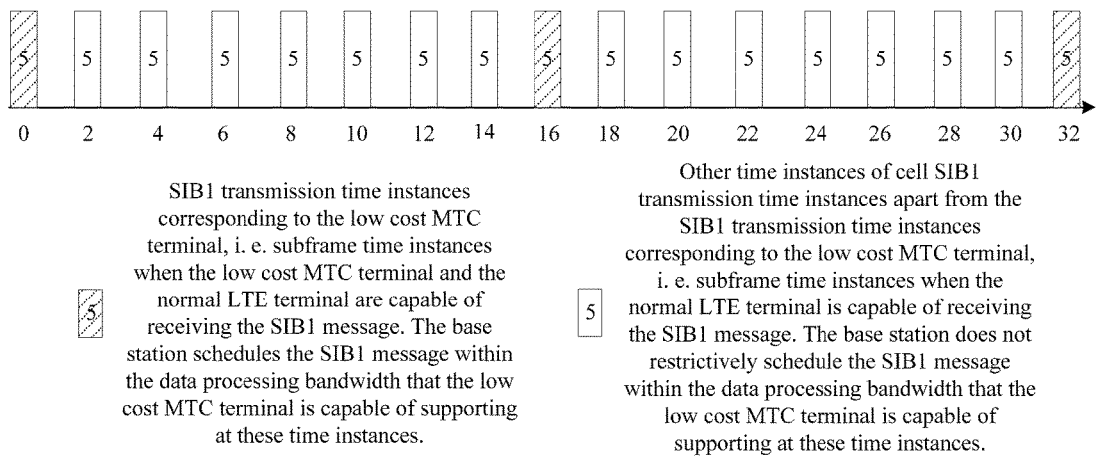
FIG. 4 is an exemplary schematic diagram of transmission time instances of the SIB1 in the embodiment shown in FIG. 3.

A clear and complete description of technical solutions of the embodiments of the present disclosure will be given below, in combination with the accompanying drawings in the embodiments of the present disclosure. Apparently, the embodiments described below are merely a part, but not all, of the embodiments of the present disclosure. All of other embodiments, obtained by those skilled in the art based on the embodiments of the present disclosure without any inventive efforts, fall into the protection scope of the present disclosure.

An embodiment of the present disclosure provides a transmission method for a common message, being executed by a base station, and as shown in FIG. 1, including the following steps.

101, the base station determines common message transmission time instances corresponding to a first terminal, wherein the common message transmission time instances corresponding to the first terminal are a part of time instances of cell common message transmission time instances.

When the base station needs to broadcast or multicast a common message to terminals in the coverage of a present cell, for each common message, the base station broadcasts or multicasts the common message to the terminals in the coverage of the cell at several time instances. In the embodiment of the present disclosure, the several time instances are called as the cell common message transmission time instances.

In the embodiment of the present disclosure, in order to effectively ensure that the first terminal is capable of receiving the common message reliably, a part of time instances of the cell common message transmission time instances are taken as the common message transmission time instances corresponding to the first terminal, and the base station may send the common message to the first terminal at this part time instances.

Specifically, in this step, the common message transmission time instances corresponding to the first terminal are preset properly, and the base station may determine the common message transmission time instances corresponding to the first terminal according to presetting.

For example, each time instance of the common message transmission time instances corresponding to the first terminal may be one subframe, or may also be multiple subframes, e.g., a transmission window including at least one subframe.

102, the base station sends a common message at the determined common message transmission time instances corresponding to the first terminal, wherein a bandwidth of frequency resources used for sending the common message is no larger than a data processing bandwidth that the first terminal is capable of supporting.

In this step, when the base station sends the common message at the common message transmission time instances corresponding to the first terminal, the transmission of the common message is scheduled restrictively within the data processing bandwidth that the first terminal is capable of supporting, hence, the first terminal is capable of receiving the common message at the common message transmission time instances corresponding the first terminal and the reliability of receiving the common message may be ensured effectively.

It shall be noted that, in the case that each time instance of the common message transmission time instances corresponding to the first terminal includes at least one subframe, in this step, when the base station sends the common message at each common message transmission time instance corresponding to the first terminal, the bandwidth of frequency resources used for sending the common message in all the subframes of the time instance may be limited to be no larger than the data processing bandwidth that the first terminal is capable of supporting, or only the bandwidth of frequency resources used for sending the common message in a part of subframes of the time instance may be limited to be no larger than the data processing bandwidth that the first terminal is capable of supporting, while the bandwidth of the other part of subframes is not limited.

It may be understood that, if a second terminal that is capable of supporting a data processing bandwidth that is larger than that the first terminal is capable of supporting also exists in the coverage of the cell served by the base station, at the common message transmission time instances corresponding to the first terminal, as the bandwidth of frequency resources used for sending the common message is no larger than the data processing bandwidth that the first terminal is capable of supporting, and the data processing bandwidth that the second terminal is capable of supporting is larger than the data processing bandwidth that the first terminal is capable of supporting, the second terminal may also receive the common message at the common message transmission time instances corresponding to the first terminal.

It may also be understood that, the common message transmission time instances corresponding to the first terminal are a part of time instances of the cell common message transmission time instances, so in addition to that, the base station also sends a common message at other time instances of the cell common message transmission time instances, so that the second terminal is capable of receiving the common message at these other time instances. In the embodiment of the present disclosure, the bandwidth of frequency resources used for sending the common message at these other time instances is not limited and may be any bandwidth. Preferably, the bandwidth of frequency resources used for sending the common message at these other time instances is larger than the data processing bandwidth that the first terminal is capable of supporting, so as to effectively improve the reliability of receiving the common message by the second terminal.

Alternatively, in an embodiment of the present disclosure, the first terminal may be a low cost MTC terminal and the second terminal is a normal LTE terminal Apparently, the first terminal and the second terminal are not limited by the embodiments of the present disclosure, and may also be other categories of terminals.

Specifically, the common message transmitted in the embodiment of the present disclosure may be a system information block 1 (SIB1) message, system information (SI), a paging message, or a random access response (RAR) message.

For example, in an embodiment of the present disclosure, applying to a common message sent cyclically, e.g. the SIB1, the SI or the Paging message, the transmission method for the common message further includes the following steps.

The base station presets a common message transmission period corresponding to the first terminal and a start time instance of the common message transmission time instances corresponding to the first terminal.

In this case, in step 101, the base station determines the common message transmission time instances corresponding to the first terminal according to the preset common message transmission period corresponding to the first terminal and the start time instance of the common message transmission time instances corresponding to the first terminal.

Alternatively, in an embodiment of the present disclosure, a start time instance of a common message may be a start subframe time instance and/or a start frame time instance of the common message. The start subframe time instance means a subframe starting point of the transmission of the common message in a certain radio frame; and the start frame time instance indicates in which radio frame the common message is transmitted, or is for indirectly determining the dependency relationship between the transmission frame for the transmission of the common message and the start frame time instance. The start subframe time instance and/or the start frame time instance may be notified through signaling, or dictated properly by a system, or determined according to a certain particular functional relation.

With respect to a certain common message, the start time instance of the common message transmission time instances corresponding to the first terminal is the same as a start time instance of the cell common message transmission time instances, but the common message transmission period corresponding to the first terminal is different from a cell common message transmission period, and the common message transmission period corresponding to the first terminal is larger than the cell common message transmission period, so as to ensure that the common message transmission time instances corresponding to the first terminal are a part of time instances of the cell common message transmission time instances. Of course, it may be understood by those skilled in the art that the start time instance of the common message transmission time instances corresponding to the first terminal may also be different from the start time instance of the cell common message transmission time instances.

The cell common message transmission period means, for a certain common message, a transmission period at the cell level corresponding to the common message, which is a time interval between the neighbouring cell common message transmission time instances of the common message. That is to say, the base station sends the common message once at an interval of the cell common message transmission period of the common message. Taking the SIB1 as an example, the base station sends the SIB1 once every 20 milliseconds (ms), i.e., the cell common message transmission period of the SIB1 is 20 ms, and the SIB1 transmission period corresponding to the first terminal may be preset to be 160 ms, which means that, at a certain SIB1 transmission time instance corresponding to the first terminal, the bandwidth of frequency resources used for sending the SIB1 by the base station is no larger than the data processing bandwidth that the first terminal is capable of supporting, and after an interval of 160 ms, when the base station sends the SIB1, the used bandwidth of frequency resources is scheduled to be no larger than the data processing bandwidth that the first terminal is capable of supporting once again.

Further, in an embodiment of the present disclosure, the transmission method for the common message further includes:

sending to the first terminal a notification indicating the common message transmission period corresponding to the first terminal and/or the start time instance of the common message transmission time instances corresponding to the first terminal.

Specifically, the base station may send the above-mentioned notification to the first terminal through radio resource control (RRC) signaling.

For the first terminal, of both the common message transmission period corresponding to the first terminal and the start time instance of the common message transmission time instances corresponding to the first terminal, one may be preset properly, while the other one is notified by the base station, and of course, both of them may also be notified by the base station, so that the first terminal may determine the common message transmission time instances corresponding the first terminal according to the common message transmission period corresponding to the first terminal and the start time instance of the common message transmission time instances corresponding to the first terminal, and receive the common message at the time instances.

Specifically, e.g. for the SIB1 common message, the base station may determine the common message transmission time instances corresponding to the first terminal according to the following steps.

1) The system dictates that the SIB1 common message may be sent only in No. 5 subframe in a radio frame, therefore, the start subframe time instance S of the SIB1 common message is 5.

2) The system dictates that the start radio frame time instance N of the SIB1 common message is No. 0 radio frame.

3) The system sets through signaling the SIB1 common message transmission period T corresponding to the first terminal as 16 radio frames.

4) A common message transmission time instance of the first terminal is X, and the radio frame of X meets:

(radio frame index of $X$) mod $T=N$ (subframe index in radio frame of $X$)=start subframe time instance $S$ The transmission time instance X is No. 5 subframe in a radio frame that meets the conditions of the above formulas. Therefore, the SIB1 common message transmission time instances corresponding to the first terminal are the No. 5 subframes in radio frames 0, 16, 32, ..., 16*L, wherein L is a positive integer.

It shall be noted that, the SIB1 is taken as an example herein for describing the determination method for the common message transmission time instances corresponding to the first terminal. For a common message such as the Paging, the SI message, the RAR message, or the like, the first terminal may determine the starting point of the common message transmission time instances in accordance with an existing standard method, and the first terminal determines the common message transmission time instances in a similar way, according to the common message transmission period of the first terminal which is configured for the first terminal by the system, which will not be described redundantly herein.

Corresponding to the method shown in FIG. 1, an embodiment of the present disclosure also provides a transmission method for a common message, being executed by a first terminal, and as shown in FIG. 2, including the following steps.

201, the first terminal determines common message transmission time instances corresponding to the first terminal, wherein the common message transmission time instances corresponding to the first terminal are a part of time instances of cell common message transmission time instances.

202, the first terminal receives a common message sent by a base station at the determined common message transmission time instances corresponding to the first terminal, wherein a bandwidth of frequency resources used for sending the common message by the base station is no larger than a data processing bandwidth that the first terminal is capable of supporting.

The transmission method for the common message provided by the embodiment of the present disclosure, as the used bandwidth of frequency resources is no larger than the data processing bandwidth that the first terminal is capable of supporting when the base station sends the common message at the common message transmission time instances corresponding to the first terminal, may effectively ensure reliable reception of the common message of the first terminal; and, as the second terminal may also receive the common message reliably at these time instances, and apparently, the second terminal may also receive the common message at the other time instances of the cell common message transmission time instances apart from the common message transmission time instances corresponding to the first terminal, may effectively ensure reliable reception of the common message of the second terminal as well. When the first terminal is a low cost MTC terminal and the second terminal is a normal LTE terminal, the transmission method for the common message provided by the embodiment of the present disclosure may effectively ensure that both the low cost MTC terminal and the normal LTE terminal are capable of receiving the common message reliably.

Specifically, the common message transmitted in the embodiment of the present disclosure may be a system information block 1 (SIB1) message, system information (SI), a Paging message or a RAR message.

Alternatively, in an embodiment of the present disclosure, for a common message sent cyclically, e.g. the SIB1, the SI or the Paging message, the transmission method for common message may further include the following steps.

the first terminal acquires a common message transmission period corresponding to the first terminal and a start time instance of the common message transmission time instances corresponding to the first terminal, wherein the common message transmission period corresponding to the first terminal is larger than a cell common message transmission period;

in this case, in step 201, the first terminal determines the common message transmission time instances corresponding to the first terminal according to the acquired common message transmission period corresponding to the first terminal and the start time instance of the common message transmission time instances corresponding to the first terminal.

Specifically, for the first terminal, of both the common message transmission period corresponding to the first terminal and the start time instance of the common message transmission time instances corresponding to the first terminal, at least one may be preset properly, and of course, at least one may also be notified by the base station, therefore, the first terminal may specifically acquire the two mentioned above in the following ways.

1, Both of the two are preset properly, therefore, the first terminal acquires the common message transmission period corresponding to the first terminal and the start time instance of the common message transmission time instances corresponding to the first terminal according to presetting.

2, One of the two is preset properly, and the other one is notified by base station, therefore, the first terminal acquires one of the common message transmission period corresponding to the first terminal and the start time instance of the common message transmission time instances corresponding to the first terminal according to presetting; and the first terminal receives a notification sent by the base station and indicating the other one of the common message transmission period corresponding to the first terminal and the start time instance of the common message transmission time instances corresponding to the first terminal, and the first terminal acquires the other one of the common message transmission period corresponding to the first terminal and the start time instance of the common message transmission time instances corresponding to the first terminal according to the notification of the base station;

3, Both of the two are notified by base station, therefore, the first terminal receives a notification sent by the base station and indicating the common message transmission period corresponding to the first terminal and the start time instance of the common message transmission time instances corresponding to the first terminal, and the first terminal acquires the common message transmission period corresponding to the first terminal and the start time instance of the common message transmission time instances corresponding to the first terminal according to the notification of the base station.

Specifically, in an embodiment of the present disclosure, the start time instance of the common message transmission time instances includes a start subframe time instance and a start radio frame time instance of the common message transmission time instances. It shall be noted that, for the first terminal, both of the two may be preset properly, or at least one of the two may also be notified to the first terminal by the base station, which is not limited by the present disclosure. In this case, the first terminal may determine the common message transmission time instances corresponding to the first terminal according to the following formulas:

$$(\text{radio frame index of } X) \bmod T = \text{start frame time instance } N$$

$$(\text{subframe index in radio frame of } X) = \text{start subframe time instance } S$$

wherein X is a common message transmission time instance corresponding to the first terminal, T is the common message transmission period corresponding to the first terminal, N is the start radio frame time instance of the common message transmission time instances corresponding to the first terminal, S is the start subframe time instance of the common message transmission time instances corresponding to the first terminal, and mod is modulus operation.

A further detailed description of the transmission method for the common message provided by the embodiments of the present disclosure is given below, with reference to an example that the first terminal is a low cost MTC terminal and the second terminal is a normal LTE terminal.

Embodiment 1

In this embodiment, a common message transmitted by a base station is SIB1, and as shown in FIG. 3, a transmission method for the common message of this embodiment includes the following steps.

301, the base station determines SIB1 transmission time instances corresponding to a low cost MTC terminal and other SIB1 transmission time instances of cell SIB1 transmission time instances apart from the SIB1 transmission time instances corresponding to the low cost MTC terminal according to presetting.

In this step, the base station may determine the SIB1 transmission time instances corresponding to the low cost MTC terminal according to a preset SIB1 transmission period T-MTC corresponding to the low cost MTC terminal and a start time instance of the SIB1 transmission time instances corresponding to the low cost MTC terminal, and determine the other SIB1 transmission time instances according to a preset cell SIB1 transmission period, a start time instance of the cell SIB1 transmission time instances and the SIB1 transmission time instances corresponding to the low cost MTC terminal.

For example, in this embodiment, the SIB1 transmission period T-MTC corresponding to the low cost MTC terminal may be 20N ms or 2N radio frames, wherein N is an integer larger than 1, e.g. the SIB1 transmission period T-MTC corresponding to the low cost MTC terminal is 160 ms or 16 radio frames, the start time instance of the SIB1 transmission time instances corresponding to the MTC terminal is No, 5 subframe of No, 0 radio frame, the cell SIB1 transmission period is 20 ms, and the start time instance of the cell SIB1 transmission time instances is No, 5 subframe of No, 0 radio frame.

With reference to an example that the SIB1 transmission period corresponding to the low cost MTC terminal is 160 ms, in this step, for the SIB1 transmission time instances corresponding to the MTC terminal and the other SIB1 transmission time instances determined by the base station, please refer to FIG. 4. In FIG. 4, numerical values on the horizontal coordinate represent values of system frame numbers (SFN), each rectangular block represents a subframe, the number in each rectangular block is the index of the subframe, rectangular blocks with twills represent SIB1 transmission time instances corresponding to the MTC terminal, and blank rectangular blocks represent other SIB1 transmission time instances. The SIB1 transmission period corresponding to the low cost MTC terminal is 160 ms, i.e., 16 radio frames, so the radio frame index for sending the SIB1 message corresponding to the low cost MTC terminal meets:
SFN mod 16=0, wherein mod is modulus operation.

302, the base station sends the SIB1 at the determined SIB1 transmission time instances corresponding to the low cost MTC terminal and the other SIB1 transmission time instances, wherein the bandwidth of frequency resources used for sending the SIB1 at the SIB1 transmission time instances corresponding to the low cost MTC terminal is no larger than the data processing bandwidth that the low cost MTC terminal is capable of supporting.

In this step, the bandwidth of frequency resources used for sending the SIB1 at the other SIB1 transmission time instances by the base station is not limited, and is preferably larger than the data processing bandwidth that the low cost MTC terminal is capable of supporting.

Also taking FIG. 4 as an example, in this step, in the subframes represented by the rectangular blocks with twills, i.e., at the SIB1 transmission time instances corresponding to the low cost MTC terminal, the base station needs to schedule the SIB1 message within the data processing bandwidth that the low cost MTC terminal is capable of supporting, i.e., the bandwidth of frequency resources used for sending the SIB1 is no larger than the data processing bandwidth that the low cost MTC terminal is capable of supporting, and in the subframes represented by the other blank rectangular blocks, the base station may not perform limiting scheduling. Therefore, the low cost MTC terminal is capable of receiving the SIB1 reliably at the SIB1 transmission time instances corresponding to the low cost MTC terminal, and a normal LTE terminal is capable of receiving the SIB1 reliably at the SIB1 transmission time instances corresponding to the low cost MTC terminal and the other transmission time instances.

303, the low cost MTC terminal receives the SIB1 message at the SIB1 message transmission time instances corresponding the low cost MTC terminal, and the normal LTE terminal receives the SIB1 message at the cell SIB1 message transmission time instances.

Before the low cost MTC terminal receives the SIB1 message, the low cost MTC terminal determines the SIB1 message transmission time instances corresponding the low cost MTC terminal according to presetting and/or the notification of the base station. Similarly, before the normal LTE terminal receives the SIB1 message, the normal LTE terminal determines the cell SIB1 message transmission time instances according to presetting and/or the notification of the base station.

In this embodiment, the bandwidth of frequency resources used for sending the SIB1 by the base station at the SIB1 transmission time instances corresponding to the MTC terminal is no larger than the data processing bandwidth that the low cost MTC terminal is capable of supporting, so the low cost MTC terminal may reliably receive the SIB1 at the SIB1 transmission time instances corresponding the low cost MTC terminal, and the normal LTE terminal may reliably receive the SIB1 at the cell SIB1 transmission time instances including the SIB1 transmission time instances corresponding to the low cost MTC terminal and the other transmission time instances, therefore, when it is effectively ensured that the normal LTE terminal receives the SIB1 message reliably, at the same time, the low cost MTC terminal may perform receiving the SIB1 message reliably.

It shall be noted that, the low cost MTC terminal may perform soft information combination on the received SIB1 at different time instances, so as to improve the reliability of decoding the SIB1 message.

Embodiment 2

In this embodiment, a common message transmitted by a base station is SI. In an LTE system, the number of the SI message, the SI message transmission window length (si-WindowLength) and the transmission periodicity (si-Periodicity) of each SI message are configured by the SIB1 message. The transmission of each SI message has a transmission window, the base station transmits the SI message in the transmission window according to the periodicity set by the system for the SI, and the base station may transmit the SI message one or more times in one or more subframes in one transmission window.

As shown in FIG. 5, a transmission method for the common message of this embodiment includes:

401, the base station predefines SI transmission time instances corresponding to a low cost MTC terminal.

The SI transmission time instances corresponding to the low cost MTC terminal predefined by the base station may be one or several transmission subframes, or may also be a transmission window including at least one subframe. For example, the SI transmission subframes corresponding to the low cost MTC terminal may be one or several particular subframes in each cell SI transmission window, or SI transmission windows corresponding to the low cost MTC terminal may be a part of transmission windows of cell SI transmission windows.

402, the base station determines the SI transmission time instances corresponding to the low cost MTC terminal according to predefinition.

403, the base station sends the SI at the determined SI transmission time instances corresponding to the low cost MTC terminal, wherein the bandwidth of frequency resources used for sending the SI is no larger than a data processing bandwidth that the low cost MTC terminal is capable of supporting.

Specifically, when the SI transmission time instances corresponding to the low cost MTC terminal are transmission subframes, the base station sends the SI in these transmission subframes, and the bandwidth of frequency resources used for sending the SI in these transmission subframes is no larger than the data processing bandwidth that the low cost MTC terminal is capable of supporting. For example, the SI transmission time instances corresponding to the low cost MTC terminal are a particular subframe in each cell SI transmission window, e.g., the first subframe in each transmission window, in this case, the base station sends the SI in the subframe, and the bandwidth of frequency resources used for sending the SI in the subframe is no larger than the data processing bandwidth that the low cost MTC terminal is capable of supporting.

For example, when the SI transmission time instances corresponding to the low cost MTC terminal is a transmission window, the base station may send the SI in all the subframes in the transmission window, and the bandwidth of frequency resources used for sending the SI in all the subframes or in a part of the subframes in the transmission window is no larger than the data processing bandwidth that the low cost MTC terminal is capable of supporting.

404, the low cost MTC terminal receives the SI at the SI transmission time instances corresponding the low cost MTC terminal.

Before the low cost MTC terminal receives the SI, the low cost MTC terminal determines the SI transmission time instances corresponding the low cost MTC terminal according to presetting and/or the notification of the base station.

Embodiment 3

In this embodiment, a common message transmitted by a base station is a RAR, as shown in FIG. 6, a transmission method for the common message of this embodiment includes:

501, the base station predefines RAR transmission time instances corresponding to a low cost MTC terminal.

The transmission time instances may be a transmission subframe or a transmission window, e.g., the transmission time instances for transmitting the common message RAR predefined for the low cost MTC terminal by the base station may be the first available downlink subframe or subframe window subsequent to a determined time instance after a message 1 is sent by the low cost MTC terminal.

502, the base station determines the RAR transmission time instances corresponding to the low cost MTC terminal according to predefinition.

503, the base station sends the RAR at the determined RAR transmission time instances corresponding to the low cost MTC terminal, and the bandwidth of frequency resources used for sending the RAR is no larger than a data processing bandwidth that the low cost MTC terminal is capable of supporting.

504, the low cost MTC terminal receives the RAR at the RAR transmission time instances corresponding the low cost MTC terminal.

Before the low cost MTC terminal receives the RAR, the low cost MTC terminal determines the RAR transmission time instances corresponding the low cost MTC terminal according to presetting and/or the notification of the base station.

Embodiment 4

In this embodiment, a common message transmitted by a base station is paging message (Paging), and as shown in FIG. 7, a transmission method for the common message of this embodiment includes:

601, the base station receives a paging request message of a mobility management entity (MME), wherein the paging request message carries category indication information of a paging terminal, which may indicate that the paging terminal is a low cost MTC terminal or a normal LTE terminal.

In this embodiment, the low cost MTC terminal needs to report its capability to a network side, that is to say, to report the information indicating that it is the low cost MTC terminal to the network side. The MME makes the paging request message (i.e., Paging message) sent to the base station carry the category indication information of the paging terminal after receiving the reported capability of the low cost MTC terminal, that is to say, the MME needs to notify the base station that the terminal to be paged is the low cost MTC terminal or the normal LTE terminal, so that the base station may adopt different modes according to different categories of terminal when sending the paging message.

602, when the paging terminal is the low cost MTC terminal, the base station determines paging message transmission time instances corresponding to the low cost MTC terminal according to presetting.

In this step, the base station may determine the paging message transmission time instances corresponding to the low cost MTC terminal according to a preset paging period and a preset start time instance of the paging message corresponding to the low cost MTC terminal. Alternatively, the system may set a common paging period, which is longer than the common paging period of the normal LTE terminal, for the low cost MTC terminal, i.e., a default paging period. If there is a dedicated or UE-specific paging period for the low cost MTC terminal, the paging period of the low cost MTC terminal may be the maximal value or the minimal value of the dedicated or UE-specific paging period and the common paging period set by the system for the low cost MTC terminal. It shall be noted that, the base station may add a new information element (IE), which may be named as defaulyPagingPeriod for MTC IE, in PCCH-Config signaling in system broadcast information, and the IE is used for setting the common paging period for the low cost MTC terminal.

603, the base station sends the paging message (Paging) to the paging terminal at the determined paging message transmission time instances corresponding to the low cost MTC terminal, wherein the bandwidth of frequency resources used for sending the common message (Paging) is no larger than a data processing bandwidth that the low cost MTC terminal is capable of supporting.

604, the low cost MTC terminal receives the paging message (Paging) at the paging message transmission time instances corresponding the low cost MTC terminal.

Before the low cost MTC terminal receives the paging message, the low cost MTC terminal determines the paging message transmission time instances corresponding the low cost MTC terminal according to presetting and/or the notification of the base station.

Figure 8:
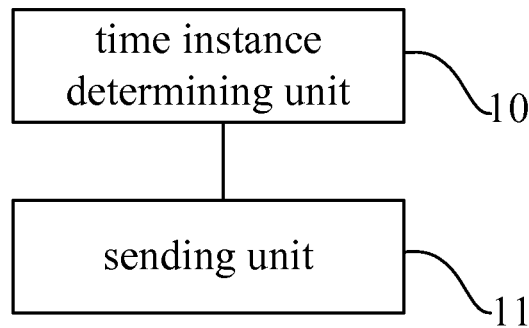
FIG. 8 is a structural block diagram of a base station provided by an embodiment of the present disclosure.

Corresponding to the aforementioned method embodiments, an embodiment of the present disclosure provides a base station, as shown in FIG. 8, including:

a time instance determining unit 10, configured to determine common message transmission time instances corresponding to a first terminal, wherein the common message transmission time instances corresponding to the first terminal are a part of time instances of cell common message transmission time instances; and a sending unit 11, configured to send a common message at the common message transmission time instances corresponding to the first terminal determined by a time instance determining unit 10, a bandwidth of frequency resources used for sending the common message being no larger than a data processing bandwidth that the first terminal is capable of supporting, so that both the first terminal and a second terminal are capable of receiving the common message at the common message transmission time instances corresponding to the first terminal, wherein a data processing bandwidth that the second terminal is capable of supporting is larger than the data processing bandwidth that the first terminal is capable of supporting.

The base station provided by the embodiment of the present disclosure takes a part of time instances of the cell common message transmission time instances as the common message transmission time instances corresponding to the first terminal, and when sending the common message at these time instances, the used bandwidth of frequency resources is no larger than the data processing bandwidth that the first terminal is capable of supporting, therefore, reliable reception of the common message of the first terminal may be ensured effectively; and the second terminal may also receive the common message reliably at these time instances, and apparently, the second terminal may also receive the common message at the other time instances of the cell common message transmission time instances apart from the common message transmission time instances corresponding to the first terminal, therefore, reliable reception of the common message of the second terminal may also be ensured effectively. When the first terminal is a low cost MTC terminal and the second terminal is a normal LTE terminal, the base station provided by the embodiment of the present disclosure may effectively ensure that both the low cost MTC terminal and the normal LTE terminal are capable of receiving the common message reliably.

Alternatively, in an embodiment of the present disclosure, the sending unit 11 may be further configured to send a common message at other time instances of the cell common message transmission time instances apart from the common message transmission time instances corresponding to the first terminal, so that the second terminal is capable of receiving the common message at the other time instances. Preferably, the bandwidth of frequency resources used for sending the common message at the other time instances by the sending unit 11 is larger than the data processing bandwidth that the first terminal is capable of supporting, so as to effectively ensure that the second terminal may reliably receive the common message at the other time instances.

Alternatively, in an embodiment of the present disclosure, each time instance of the common message transmission time instances corresponding to the first terminal determined by the time instance determining unit 10 may include one or more subframes, in this case, the sending unit 11 may be configured to send the common message at the common message transmission time instances corresponding to the first terminal determined by the time instance determining unit 10, wherein the bandwidth of frequency resources used for sending the common message in at least one subframe of each common message transmission time instance is no larger than the data processing bandwidth that the first terminal is capable of supporting.

Specifically, the common message transmitted by the base station may be a SIB1 message, SI, a paging message or a random access response (RAR) message.

Alternatively, in an embodiment of the present disclosure, the time instance determining unit 10 is configured to determine the common message transmission time instances corresponding to a first terminal according to a common message transmission period corresponding to the first terminal and a start time instance of the common message transmission time instances corresponding to the first terminal.

Applying to a common message transmitted cyclically, e.g., the SIB1, the SI or the Paging message, alternatively, in an embodiment of the present disclosure, the sending unit 11 is further configured to send to the first terminal a notification indicating the common message transmission period corresponding to the first terminal and/or the start time instance of the common message transmission time instances corresponding to the first terminal, so that the first terminal determines the common message transmission time instances corresponding to the first terminal according to the notification.

Specifically, in an embodiment of the present disclosure, the start time instance of the common message transmission time instances includes a start subframe time instance and a start radio frame time instance of the common message transmission time instances; and the time instance determining unit 10 may determine the common message transmission time instances corresponding to the first terminal according to the following formulas:

$$(\text{radio frame index of } X) \bmod T = N$$

$$(\text{subframe index in radio frame of } X) = S$$

wherein X is a common message transmission time instance corresponding to the first terminal, T is the common message transmission period corresponding to the first terminal, N is a start radio frame time instance of the common message transmission time instances corresponding to the first terminal, S is a start subframe time instance of the common message transmission time instances corresponding to the first terminal, and mod is modulus operation.

Figure 9:
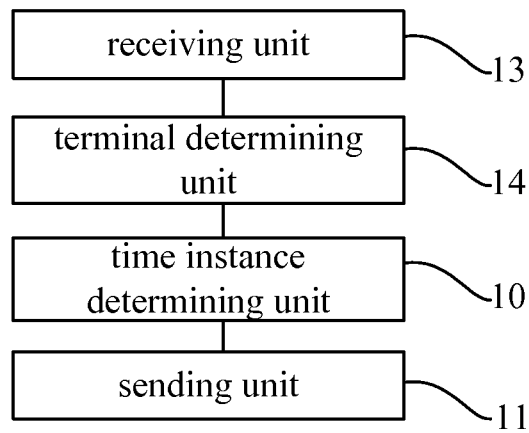
FIG. 9 is a structural block diagram of a base station provided by an embodiment of the present disclosure.

Alternatively, as shown in FIG. 9, in an embodiment of the present disclosure, the common message transmitted is a paging message;
the base station provided further includes:
a receiving unit 13, configured to receiving a paging request message of a mobility management entity, wherein the paging request message carries category indication information of a paging terminal;

a terminal determining unit 14, configured to determine whether the paging terminal is the first terminal or the second terminal according to the category indication information received by the receiving unit 13;

the time instance determining unit 10 is configured to determine paging message transmission time instances corresponding to the first terminal if it is determined that the paging terminal is the first terminal by the terminal determining unit 14;

and the sending unit 11 is configured to send the paging message to the paging terminal at the paging message transmission time instances corresponding to the first terminal determined by the time instance determining unit 14.

It shall be noted that, in an embodiment of the present disclosure, the base station provided includes a processor and a memory, and the above-mentioned function units are located in the processor.

Figure 10:
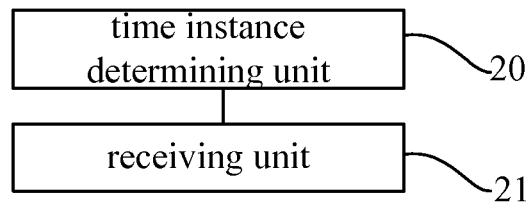
FIG. 10 is a structural block diagram of a terminal equipment provided by an embodiment of the present disclosure.

Corresponding to the aforementioned method embodiments, an embodiment of the present disclosure provides a terminal equipment which may servie as the first terminal in the aforementioned method embodiments, as shown in FIG. 10, including:

a time instance determining unit 20, configured to determine common message transmission time instances corresponding to the terminal equipment, wherein the common message transmission time instance corresponding to the terminal equipment is a part of time instances of cell common message transmission time instances; and a receiving unit 21, configured to receive a common message sent by a base station at the common message transmission time instance corresponding to the terminal equipment determined by the time instance determining unit 20, wherein a bandwidth of frequency resources used for sending the common message by the base station is no larger than a data processing bandwidth that the terminal equipment is capable of supporting.

The terminal equipment provided by the embodiment of the present disclosure receives the common message at a part of time instances of the cell common message transmission time instances, and the bandwidth of frequency resources used for sending the common message by the base station at these time instances is no larger than the data processing bandwidth that the terminal equipment is capable of supporting, therefore, reliable reception of the common message of the terminal equipment may be effectively ensured.

In an embodiment of the present disclosure, the terminal equipment provided is a low cost LTE terminal.

Figures 11, 12:
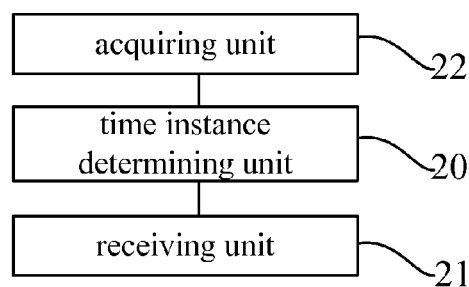
FIG. 11 is a structural block diagram of a terminal equipment provided by an embodiment of the present disclosure.
FIG. 12 is a flowchart of another transmission method for a common message provided by an embodiment of the present disclosure.

Alternatively, in an embodiment of the present disclosure, as shown in FIG. 11, the terminal equipment provided may further include:

an acquiring unit 22, configured to acquire a common message transmission period corresponding to the terminal equipment and a start time instance of the common message transmission time instances corresponding to the terminal equipment, wherein the common message transmission period corresponding to the terminal equipment is larger than a cell common message transmission period;

in this case, the time instance determining unit 20 is configured to determine the common message transmission time instances corresponding to the terminal equipment according to the common message transmission period corresponding to the terminal equipment and the start time instance of the common message transmission time instances corresponding to the terminal equipment acquired by the acquiring unit 22.

Specifically, the acquiring unit 22 may acquire the common message transmission period corresponding to the terminal equipment and the start time instance of the common message transmission time instances corresponding to the terminal equipment according to presetting; the acquiring unit 22 may also acquire one of the common message transmission period corresponding to the terminal equipment and the start time instance of the common message transmission time instances corresponding to the terminal equipment according to presetting, and receive a notification sent by the base station and indicating the other one of the common message transmission period corresponding to the terminal equipment and the start time instance of the common message transmission time instances corresponding to the terminal equipment, and acquire the other one of the common message transmission period corresponding to the terminal equipment and the start time instance of the common message transmission time instances corresponding to the terminal equipment according to the notification of the base station; the acquiring unit 22 may also receive a notification sent by the base station and indicating the common message transmission period corresponding to the terminal equipment and the start time instance of the common message transmission time instances corresponding to the terminal equipment, and acquire the common message transmission period corresponding to the terminal equipment and the start time instance of the common message transmission time instances corresponding to the terminal equipment according to the notification of the base station.

Alternatively, in an embodiment of the present disclosure, the start time instance of the common message transmission time instances includes a start subframe time instance and a start radio frame time instance of the common message transmission time instances;

the time instance determining unit 20 is configured to determine the common message transmission time instance corresponding to the terminal equipment according to the following formulas:

$$(\text{radio frame index of } X) \bmod T = N$$

$$(\text{subframe index in radio frame of } X) = S$$

wherein X is a common message transmission time instance corresponding to the terminal equipment, T is the common message transmission period corresponding to the terminal equipment, N is the start radio frame time instance of the common message transmission time instance corresponding to the terminal equipment, S is the start subframe time instance of the common message transmission time instance corresponding to the terminal equipment, and mod is modulus operation.

It shall be noted that, in an embodiment of the present disclosure, the terminal equipment provided includes a processor and a memory, and the above-mentioned function units are located in the processor.

In another aspect of the present disclosure, as shown in FIG. 12, a transmission method for a common message is also provided, being executed by a base station and including the following steps.

1000, the base station sends a first common message corresponding to a first terminal.

1001, the base station sends a second common message corresponding to a second terminal.

The first common message is a common message obtained by simplifying the content of the second common message, and a data processing bandwidth that the first terminal is capable of supporting is smaller than a data processing bandwidth that the second terminal is capable of supporting.

According to the transmission method for the common message provided by the embodiment of the present disclosure, the base station sends the common message to the first terminal and the second terminal respectively, although the data processing bandwidth that the first terminal is capable of supporting is smaller than the data processing bandwidth that the second terminal is capable of supporting, but the common message sent to the first terminal is simplified compared with the common message sent to the second terminal, and the demand on the data processing bandwidth that the first terminal is capable of supporting is met, and the common message corresponding to the second terminal may be sent normally, therefore, reliable reception of the common message of the first terminal and the second terminal may be ensured effectively. When the first terminal is a low cost MTC terminal and the second terminal is a normal LTE terminal, the transmission method for the common message provided by the embodiments of the present disclosure may effectively ensure that both the low-cost MTC terminal and the normal LTE terminal may reliably receive the common message.

It shall be noted that, the order of the above-mentioned two steps 1000 and 1001 is not limited, the first common message and the second common message may be sent either concurrently or sequentially, for example, the base station may send the first common message at first, or send the second common message at first.

Specifically, in an embodiment of the present disclosure, the first terminal may be a low cost LTE terminal and the second terminal may be a normal LTE terminal.

That the first common message is a common message obtained by simplifying the content of the second common message means that the first common message is the simplified second common message in fact, that is to say, the first common message is partially identical to the second common message, but the information categories included in the first common message are less than the information categories included in the second common message, or, the information size of the first common message is smaller than the information size of the second common message. The first common message corresponding to the first terminal is simplified compared with the second common message, so the reliability of receiving the first common message of the first terminal may be effectively improved.

For example, when the first message and the second common message are SI, the information categories included in the first common message may be less than the information categories included in the second common message.

Taking it as an example that the second terminal is the normal LTE terminal and the first terminal is the low cost MTC terminal, of course, also applying to other terminals, the second common message may include one or more SIBs from SIB2 to SIB13, and in terms of capability limitation and service property of the first terminal, the first terminal may not support or optionally support some SIBs.

For example, if the first terminal does not support multiple radio access techniques (RAT), SIB6, SIB7 and SIB8 are not needed. Therefore, when the second common message includes any one or several of SIB6, SIB7 and SIB8, the first common message may omit the any one or several, that is to say, the first common message does not include the any one or several. If the first terminal does not support a earthquake and tsunami warning System (ETWS) and a commercial mobile alert service (CMAS), SIB10, SIB11 and SIB12 are not needed, therefore, when the second common message includes any one or several of SIB10, SIB11 and SIB12, the first common message may omit the any one or several, that is to say, the first common message does not include the any one or several.

If the first terminal does not support a multimedia broadcast multicast service (MBMS), SIB13 is not needed either, therefore, when the second common message includes SIB13, the first common message may omit SIB13, that is to say, the first common message does not include SIB13. While SIB5 is optionally supported by the first terminal, e.g., if some first terminals may carry out intra-frequency cell selection, SIB5 may be supported by these terminals, on the contrary, if some first terminals may not carry out intra-frequency cell selection, SIB5 is not supported by this type of first terminals. That is to say, when the second common message includes SIB5, the first common message may include SIB5 or not.

Similarly, SIB9 may also be optionally supported by the first terminal, e.g., if some first terminals may communicate with a home base station, SIB9 may be supported by these terminals, on the contrary, if some first terminals may not communicate with a home base station, SIB9 is not supported by this type of first terminals. That is to say, when the second common message includes SIB9, the first common message may include SIB9 or not. However, SIB2, SIB3 and SIB4 must be supported by the first terminal, that is to say, the must included SIB2, SIB3 and SIB4 may not be simplified in the first common message.

To sum up, the base station may configure and send the SI to the first terminal in accordance with Table 1:

TABLE 1

SIB Configuration of SI Corresponding to First Terminal

| SIB Category | Support or Not |
| --- | --- |
| SIB1 | Support |
| SIB2 | Support |
| SIB3, SIB4 | Support |
| SIB5 | Optionally Support |
| SIB6, SIB7, SIB8 | Not Support |
| SIB9 | Optionally Support |
| SIB10, SIB11, SIB12 | Not Support |
| SIB13 | Not Support |

It shall be noted that, as the number of SIBs supported by the first terminal is reduced, some optimization may be implemented by the base station during SI message transmission, so as to facilitate SI message detection of the first terminal. For example, the base station may limit the maximal SI number that the first terminal is capable of supporting to be 4, keep the window size of each SI message detection unchanged, limit the period of each SI message that the first terminal is capable of supporting, etc.

For example, when the first common message and the second common message are SIB1, the information size of the first common message may be smaller than that of the second common message, specifically, compared with the second common message, the number of bits corresponding to some information in the first common message is decreased, that is to say, the number of bits corresponding to some information in the first common message is smaller than the number of bits corresponding to this category of information in the second common message. For example, the number of bits corresponding to a public land mobility network identity list (plmn-IdentityList) of the first common message may be smaller than the number of bits corresponding to a plmn-IdentityList of the second common message; the number of bits corresponding to a schedulingInfoList of the first common message may be smaller than the number of bits corresponding to a scheduling information list (schedulingInfoList) of the second common message; the number of bits corresponding to scheduling information (SchedulingInfo) of the first common message may be smaller than the number of bits corresponding to SchedulingInfo of the second common message.

It may be understood that, those skilled in the art may also decrease the number of bits corresponding to other information in the first common message, so that the number of bits corresponding to other information in the first common message is smaller than the number of bits corresponding to this category of information in the second common message, which is not limited by the present disclosure.

Corresponding to the method embodiment shown in FIG. 12, in another aspect of the present disclosure, a transmission method for a common message is also provided, being executed by a first terminal and including the following step: a first terminal receives a first common message sent by a base station, the first common message being a common message obtained by simplifying the content of a common message sent to a second terminal by the base station, wherein a data processing bandwidth that the first terminal is capable of supporting is smaller than a data processing bandwidth that the second terminal is capable of supporting.

Alternatively, the information categories included in the first common message are less than the information categories included in the second common message, or, the information size of the first common message is smaller than the information size of the second common message.

The transmission method provided by the embodiment of the present disclosure, as the base station sends the common message to the first terminal and the second terminal respectively, the common message sent to the first terminal is simplified compared with the common message sent to the second terminal, and the demand on the data processing bandwidth that the first terminal is capable of supporting is met, may effectively ensure reliable reception of the common message of the first terminal and the second terminal. When the first terminal is a low cost MTC terminal and the second terminal is a normal LTE terminal, the transmission method for the common message provided by the embodiment of the present disclosure may effectively ensure that both the low cost MTC terminal and the normal LTE terminal may reliably receive the common message.

Specifically, in an embodiment of the present disclosure, the first common message and the second common message are SI, the information categories included in the first common message are less than the information categories included in the second common message, for example, the first and second common messages may meet at least one of the following conditions:
the second common information includes SIB6, and the first common information does not include SIB6;
the second common information includes SIB7, and the first common information does not include SIB7;
the second common information includes SIB8, and the first common information does not include SIB8;
the second common information includes SIB10, and the first common information does not include SIB10;
the second common information includes SIB11, and the first common information does not include SIB11;
the second common information includes SIB12, and the first common information does not include SIB12;
the second common information includes SIB5, and the first common information includes or does not include SIB5; and
the second common information includes SIB9, and the first common information includes or does not include SIB9.

Specifically, in an embodiment of the present disclosure, the first and second common messages are SIB1, the information size of the first common message is smaller than that of the second common message, for example, the number of bits corresponding to a plmn-IdentityList of the first common message may be smaller than the number of bits corresponding to a plmn-IdentityList of the second common message; the number of bits corresponding to a schedulingInfoList of the first common message may be smaller than the number of bits corresponding to a schedulingInfoList of the second common message; the number of bits corresponding to SchedulingInfo of the first common message may be smaller than the number of bits corresponding to SchedulingInfo of the second common message.

It may be understood that, those skilled in the art may also decrease the number of bits corresponding to other information in the first common message, so that the number of bits corresponding to the other information in the first common message is smaller than the number of bits corresponding to this category of information in the second common message, which is not limited by the present disclosure.

Figure 13:
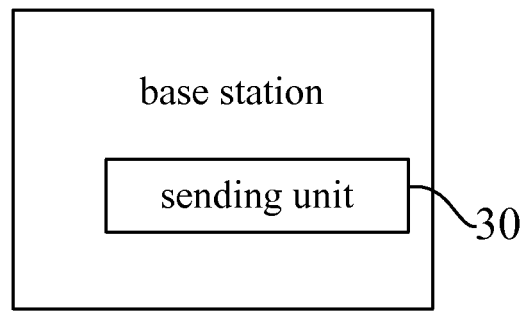
FIG. 13 is a structural block diagram of another base station provided by an embodiment of the present disclosure.

Corresponding to the method embodiment as shown in FIG. 12, in another aspect of the present disclosure, a base station is also provided, as shown in FIG. 13, including:
a sending unit 30, configured to send a first common message corresponding to a first terminal, and send a second common message corresponding to a second terminal, wherein the first common message is a common message obtained by simplifying the content of the second common message, and a data processing bandwidth that the first terminal is capable of supporting is smaller than a data processing bandwidth that the second terminal is capable of supporting.

The base station provided by the embodiment of the present disclosure sends the common message to the first terminal and the second terminal respectively, the common message sent to the first terminal is simplified compared with the common message sent to the second terminal, and the demand on the data processing bandwidth that the first terminal is capable of supporting is met, therefore, reliable reception of the common message of the first terminal and the second terminal may be ensured effectively. When the first terminal is a low cost MTC terminal and the second terminal is a normal LTE terminal, the base station provided by the embodiment of the present disclosure may effectively ensure that both the low cost MTC terminal and the normal LTE terminal may reliably receive the common message.

Alternatively, the information categories included in the first common message sent by the sending unit 30 are less than the information categories included in the second common message, or, the information size of the first common message is smaller than the information size of the second common message.

Specifically, in an embodiment of the present disclosure, the first and second common messages sent by the sending unit 30 are SI, the information categories included in the first common message are less than the information categories included in the second common message, for example, the first and second common messages may meet at least one of the following conditions:
the second common information includes SIB6, and the first common information does not include SIB6;

the second common information includes SIB7, and the first common information does not include SIB7;
the second common information includes SIB8, and the first common information does not include SIB8;
the second common information includes SIB10, and the first common information does not include SIB10;
the second common information includes SIB11, and the first common information does not include SIB11;
the second common information includes SIB12, and the first common information does not include SIB12;
the second common information includes SIB5, and the first common information includes or does not include SIB5; and
the second common information includes SIB9, and the first common information includes or does not include SIB9.

Specifically, in an embodiment of the present disclosure, the first and second common messages sent by the sending unit 30 are SIB1, the information size of the first common message is smaller than the information size of the second common message, for example, the number of bits corresponding to a plmn-IdentityList of the first common message may be smaller than the number of bits corresponding to a plmn-IdentityList of the second common message; the number of bits corresponding to a schedulingInfoList of the first common message may be smaller than the number of bits corresponding to a schedulingInfoList of the second common message; the number of bits corresponding to SchedulingInfo of the first common message may be smaller than the number of bits corresponding to SchedulingInfo of the second common message.

It may be understood that, those skilled in the art may also decrease the number of bits corresponding to other information in the first common message, so that the number of bits corresponding to the other information in the first common message is smaller than the number of bits corresponding to this category of information in the second common message, which is not limited by the present disclosure.

It shall be noted that, in an embodiment of the present disclosure, the base station provided includes a processor and a memory, and the above-mentioned function units are located in the processor.

Figure 14:
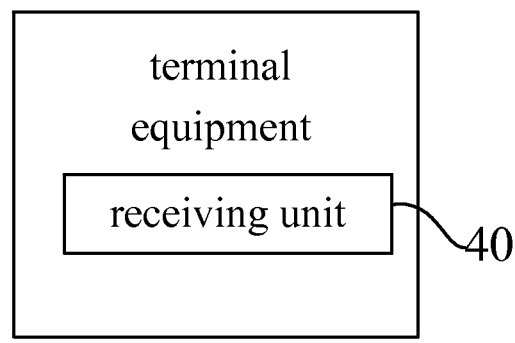
FIG. 14 is a structural block diagram of another terminal equipment provided by an embodiment of the present disclosure.

Corresponding to the method embodiment which is corresponding to the method embodiment shown in FIG. 12 and executed by the first terminal, in another aspect of the present disclosure, a terminal equipment is also provided, which may serve as the first terminal in the method embodiment, as shown in FIG. 14, including: a receiving unit 40, configured to receive a first common message sent by a base station, the first common message being a common message obtained by simplifying the content of a common message sent to a second terminal by the base station, wherein a data processing bandwidth that the terminal equipment is capable of supporting is smaller than a data processing bandwidth that the second terminal is capable of supporting.

According to the terminal equipment provided by the embodiment of the present disclosure, the base station sends the common message to the terminal equipment and the second terminal respectively; the common message sent to the terminal equipment by the base station and received by the terminal equipment is simplified compared with the common message sent to the second terminal, and the demand on the data processing bandwidth that the terminal equipment is capable of supporting is met, therefore, reliable reception of the common message of the terminal equipment and the second terminal may be ensured effectively. When the terminal equipment is low a cost MTC terminal and the second terminal is a normal LTE terminal, the transmission method for the common message provided by the embodiment of the present disclosure may effectively ensure that both the low cost MTC terminal and the normal LTE terminal may reliably receive the common message.

Alternatively, the information categories included in the first common message received by the receiving unit 40 are less than the information categories included in the second common message, or, the information size of the first common message is smaller than the information size of the second common message.

Specifically, in an embodiment of the present disclosure, the first and second common messages are SI, the information categories included in the first common message received by the receiving unit 40 are less than the information categories included in the second common message, for example, the first and second common messages may meet at least one of the following conditions:
the second common information includes SIB6, and the first common information does not include SIB6;
the second common information includes SIB7, and the first common information does not include SIB7;
the second common information includes SIB8, and the first common information does not include SIB8;
the second common information includes SIB10, and the first common information does not include SIB10;
the second common information includes SIB11, and the first common information does not include SIB11;
the second common information includes SIB12, and the first common information does not include SIB12;
the second common information includes SIB5, and the first common information includes or does not include SIB5; and
the second common information includes SIB9, and the first common information includes or does not include SIB9.

Specifically, in an embodiment of the present disclosure, the first and second common messages are SIB1, the information size of the first common message received by the receiving unit 40 is smaller than the information size of the second common message, for example, the number of bits corresponding to a plmn-IdentityList of the first common message may be smaller than the number of bits corresponding to a plmn-IdentityList of the second common message; the number of bits corresponding to a schedulingInfoList of the first common message may be smaller than the number of bits corresponding to a schedulingInfoList of the second common message; the number of bits corresponding to SchedulingInfo of the first common message may be smaller than the number of bits corresponding to SchedulingInfo of the second common message.

It may be understood that, those skilled in the art may also decrease the number of bits corresponding to other information in the first common message, so that the number of bits corresponding to the other information in the first common message is smaller than the number of bits corresponding to this category of information in the second common message, which is not limited in the present disclosure.

It shall be noted that, in an embodiment of the present disclosure, the terminal equipment provided includes a processor and a memory, and the above-mentioned function units are located in the processor.

It should be appreciated for those of ordinary skill in the art that all or a part of the procedures in the above-mentioned embodiments of a method may be implemented with a computer program instructing corresponding hardware. The above-mentioned program may be stored in a computer readable storage medium. The procedures of the embodiments of the respective methods mentioned above may be included when the program is executed; and the above-mentioned storage medium includes various kinds of medium that may store program codes, such as a ROM, a RAM, a magnetic disk, an optical disk, or the like.

It is noteworthy that various units included in the base stations and the terminal equipment provided by the embodiments of the present disclosure are only classified according to functional logic, however, these units are not limited to the classification mentioned above, and any classification that could just implement corresponding functions is acceptable; in addition, the specific names of various function units are merely for mutual differentiation, and are not for limitation to the scope of the present disclosure.

The foregoing descriptions are merely specific implementation manners of the disclosure, rather than limiting the protection scope of the disclosure. Any change or substitution that is readily conceived for any one skilled in the art within the technical scope disclosed by the disclosure shall fall into the protection scope of the disclosure. Therefore, the protection scope of the present disclosure shall be defined by the claims.

What is claimed is:

1. A transmission method for a common message, comprising:
   determining common message transmission time instances corresponding to a first terminal, wherein the common message transmission time instances corresponding to the first terminal are a part of time instances of cell common message transmission time instances,
      wherein the determining common message transmission time instances corresponding to a first terminal comprises: determining the common message transmission time instances corresponding to the first terminal according to a common message transmission period corresponding to the first terminal and a start time instance of the common message transmission time instances corresponding to the first terminal; and
   sending a first common message at the determined common message transmission time instances corresponding to the first terminal, a bandwidth of frequency resources used for sending the first common message being no larger than a data processing bandwidth that the first terminal is capable of supporting, so that both the first terminal and a second terminal are capable of receiving the first common message at the common message transmission time instances corresponding to the first terminal, wherein a data processing bandwidth that the second terminal is capable of supporting is larger than the data processing bandwidth that the first terminal is capable of supporting.

2. The transmission method according to claim 1, further comprising:
   sending a second common message at other time instances of the cell common message transmission time instances apart from the common message transmission time instances corresponding to the first terminal, so that the second terminal is capable of receiving the second common message at the other time instances, wherein a bandwidth of frequency resources used for sending the second common message at the other time instances is larger than the data processing bandwidth that the first terminal is capable of supporting.

3. The transmission method according to claim 1, wherein each time instance of the common message transmission time instances corresponding to the first terminal comprises one or more subframes; and
   the sending a first common message at the determined common message transmission time instances corresponding to the first terminal, a bandwidth of frequency resources used for sending the first common message being no larger than a data processing bandwidth that the first terminal is capable of supporting comprises:
   sending the first common message at the determined common message transmission time instances corresponding to the first terminal, a bandwidth of frequency resources used for sending the first common message in at least one subframe of each common message transmission time instance being no larger than the data processing bandwidth that the first terminal is capable of supporting.

4. The transmission method according to claim 1, further comprising:
   sending to the first terminal a notification, which indicates the common message transmission period corresponding to the first terminal and/or the start time instance of the common message transmission time instances corresponding to the first terminal.

5. The transmission method according to claim 4, wherein the sending to the first terminal a notification, comprises:
   sending to the first terminal the notification through Radio Resource Control (RRC) signaling.

6. The transmission method according to claim 1, wherein the start time instance of the common message transmission time instances comprises a start subframe time instance and a start radio frame time instance of the common message transmission time instances; and
   the determining the common message transmission time instances corresponding to the first terminal according to a common message transmission period corresponding to the first terminal and a start time instance of the common message transmission time instances corresponding to the first terminal comprises:
   determining the common message transmission time instances corresponding to the first terminal according to the following formulas:

(radio frame index of $X$) mod $T = N$ (subframe index in radio frame of $X$) = $S$ wherein $X$ is a common message transmission time instance corresponding to the first terminal, $T$ is the common message transmission period corresponding to the first terminal, $N$ is the start radio frame time instance of the common message transmission time instances corresponding to the first terminal, $S$ is the start subframe time instance of the common message transmission time instances corresponding to the first terminal, and mod is modulus operation.

7. The transmission method according to claim 1, wherein the first common message is system information block 1, system information, or a paging message.

8. The transmission method according to claim 7, wherein the first common message is a paging message;
   the transmission method further comprises:
   receiving a paging request message of a mobility management entity, wherein the paging request message carries category indication information of a paging terminal;

determining whether the paging terminal is the first terminal or the second terminal according to the category indication information;

the determining common message transmission time instances corresponding to a first terminal comprises:

determining paging message transmission time instances corresponding to the first terminal if it is determined that the paging terminal is the first terminal;

the sending a first common message at the determined common message transmission time instances corresponding to the first terminal comprises:

sending the paging message to the paging terminal at the determined paging message transmission time instances corresponding to the first terminal.

9. A base station, comprising:

a processor, configured to determine common message transmission time instances corresponding to a first terminal, wherein the common message transmission time instances corresponding to the first terminal are a part of time instances of cell common message transmission time instances, wherein the processor determines the common message transmission time instances corresponding to the first terminal according to a common message transmission period corresponding to the first terminal and a start time instance of the common message transmission time instances corresponding to the first terminal; and a transmitter, configured to send a first common message at the common message transmission time instances corresponding to the first terminal determined by the processor, a bandwidth of frequency resources used for sending the first common message being no larger than a data processing bandwidth that the first terminal is capable of supporting, so that both the first terminal and a second terminal are capable of receiving the first common message at the common message transmission time instances corresponding to the first terminal, wherein a data processing bandwidth that the second terminal is capable of supporting is larger than the data processing bandwidth that the first terminal is capable of supporting.

10. The base station according to claim 9, wherein the transmitter is further configured to send a second common message at other time instances of the cell common message transmission time instances apart from the common message transmission time instances corresponding to the first terminal, so that the second terminal is capable of receiving the second common message at the other time instances, wherein a bandwidth of frequency resources used for sending the second common message at the other time instances by the transmitter is larger than the data processing bandwidth that the first terminal is capable of supporting.

11. The base station according to claim 9, wherein each time instance of the common message transmission time instances corresponding to the first terminal comprises one or more subframes; and the transmitter is configured to send the first common message at the common message transmission time instances corresponding to the first terminal determined by the processor, a bandwidth of frequency resources used for sending the first common message in at least one subframe of each common message transmission time instance being no larger than the data processing bandwidth that the first terminal is capable of supporting.

12. The base station according to claim 9, wherein the transmitter is further configured to send to the first terminal a notification indicating the common message transmission period corresponding to the first terminal and/or the start time instance of the common message transmission time instances corresponding to the first terminal.

13. The base station according to claim 12, wherein the transmitter is configured to send to the first terminal the notification through Radio Resource Control (RRC) signaling.

14. The base station according to claim 9, wherein the processor is configured to determine the common message transmission time instances corresponding to the first terminal according to the following formulas:

(radio frame index of $X$)mod $T=N$ (subframe index in radio frame of $X$)=$S$ wherein X is a common message transmission time instance corresponding to the first terminal, T is the common message transmission period corresponding to the first terminal, N is a start radio frame time instance of the common message transmission time instances corresponding to the first terminal, S is a start subframe time instance of the common message transmission time instances corresponding to the first terminal, and mod is modulus operation.

15. The base station according to claim 9, wherein the first common message is system information block 1, system information, or a paging message.

16. The base station according to claim 15, wherein the first common message is a paging message;

the base station further comprises:

a receiver, configured to receiving a paging request message of a mobility management entity, wherein the paging request message carries category indication information of a paging terminal;

the processor is configured to determine whether the paging terminal is the first terminal or the second terminal according to the category indication information, and determine paging message transmission time instances corresponding to the first terminal if it is determined that the paging terminal is the first terminal;

the transmitter is configured to send the paging message to the paging terminal at the paging message transmission time instances corresponding to the first terminal determined by the processor.

17. A terminal equipment, comprising:

a processor, configured to determine common message transmission time instances corresponding to the terminal equipment, wherein the common message transmission time instances corresponding to the terminal equipment are a part of time instances of cell common message transmission time instances, wherein the processor is configured to acquire a common message transmission period corresponding to the terminal equipment and a start time instance of the common message transmission time instances corresponding to the terminal equipment, wherein the common message transmission period corresponding to the terminal equipment is larger than a cell common message transmission period, and determine the common message transmission time instances corresponding to the terminal equipment according to the common message transmission period corresponding to the terminal equipment and the start time instance of the common message transmission time instances corresponding to the terminal equipment; and a receiver, configured to receive a first common message sent by a base station at the common message transmission time instances corresponding to the terminal equipment determined by the processor, wherein a bandwidth of frequency resources used for sending the first common message by the base station is no larger than a data processing bandwidth that the terminal equipment is capable of supporting.

18. The terminal equipment according to claim 17, wherein the processor is configured to acquire the common message transmission period corresponding to the terminal equipment and the start time instance of the common message transmission time instances corresponding to the terminal equipment according to presetting; or receive a notification sent by the base station and indicating the common message transmission period corresponding to the terminal equipment and the start time instance of the common message transmission time instance corresponding to the terminal equipment, and acquire the common message transmission period corresponding to the terminal equipment and the start time instance of the common message transmission time instances corresponding to the terminal equipment according to the notification of the base station.

19. The terminal equipment according to claim 18, wherein the notification is sent through Radio Resource Control (RRC) signaling.

20. The terminal equipment according to claim 17, wherein the start time instance of the common message transmission time instances comprises a start subframe time instance and a start radio frame time instance of the common message transmission time instances; and the processor is configured to determine the common message transmission time instances corresponding to the terminal equipment according to the following formulas:

$$(\text{radio frame index of } X) \bmod T = N$$

$$(\text{subframe index in radio frame of } X) = S$$

wherein X is a common message transmission time instance corresponding to the terminal equipment, T is the common message transmission period corresponding to the terminal equipment, N is the start radio frame time instance of the common message transmission time instance corresponding to the terminal equipment, S is the start subframe time instance of the common message transmission time instance corresponding to the terminal equipment, and mod is modulus operation.

* * * * *